United States Patent [19]

Vidacovich et al.

[11] Patent Number: 5,247,603
[45] Date of Patent: Sep. 21, 1993

[54] FIBER OPTIC CONNECTION SYSTEM WITH EXCHANGEABLE CROSS-CONNECT AND INTERCONNECT CARDS

[75] Inventors: Kenneth J. Vidacovich, Austin; Sidney J. Berglund, Round Rock; Steven C. Bove, Leander, all of Tex.

[73] Assignee: Minnesota Mining and Manufacturing Company, St. Paul, Minn.

[21] Appl. No.: 825,398
[22] Filed: Jan. 24, 1992
[51] Int. Cl.⁵ .............................. G02B 6/36
[52] U.S. Cl. ................... 385/135; 385/134
[58] Field of Search .......... 385/135, 136, 137, 134, 385/138

[56] References Cited

U.S. PATENT DOCUMENTS

| | | | |
|---|---|---|---|
| 4,266,853 | 5/1981 | Hutchins et al. | 350/96.2 |
| 4,319,951 | 3/1982 | Korbelak et al. | 156/502 |
| 4,332,435 | 6/1982 | Post | 350/96.2 |
| 4,359,262 | 11/1982 | Dolan | 350/96.2 |
| 4,373,776 | 2/1983 | Purdy | 350/96.2 |
| 4,418,982 | 12/1983 | Williams | 350/96.2 |
| 4,428,645 | 1/1984 | Korbelak et al. | 350/96.2 |
| 4,489,830 | 12/1984 | Charlebois et al. | 206/316 |
| 4,500,166 | 2/1985 | Kunze | 350/96.2 |
| 4,595,255 | 6/1976 | Bhatt et al. | 350/96.2 |
| 4,619,499 | 10/1986 | Gerber | 350/96.2 |
| 4,630,886 | 12/1986 | Lauriello et al. | 350/96.2 |
| 4,666,240 | 5/1987 | Caron et al. | 350/96.2 |
| 4,679,896 | 7/1987 | Krafcik et al. | 350/96.2 |
| 4,685,764 | 8/1987 | Hoffer et al. | 350/96.2 |
| 4,702,551 | 10/1987 | Coulombe | 350/96.2 |
| 4,708,430 | 11/1987 | Donaldson et al. | 385/135 X |
| 4,722,585 | 2/1988 | Boyer | 350/96.2 |
| 4,765,708 | 8/1988 | Becker et al. | 350/96.2 |
| 4,792,203 | 12/1988 | Nelson et al. | 350/96.2 |
| 4,805,979 | 2/1989 | Bossard et al. | 350/96.2 |
| 4,824,196 | 4/1989 | Bylander | 350/96.2 |
| 4,900,121 | 2/1990 | Becker et al. | 350/96.2 |
| 4,900,123 | 2/1990 | Barlow et al. | 350/96.2 |
| 4,971,421 | 11/1990 | Ori | 350/96.2 |
| 5,013,121 | 5/1991 | Anton et al. | 350/96.2 |
| 5,067,784 | 11/1991 | Debortoli et al. | 385/135 X |
| 5,071,211 | 12/1991 | Debortoli et al. | 385/76 |
| 5,093,887 | 3/1992 | Witte | 385/135 |
| 5,109,467 | 4/1992 | Hogan et al. | 385/135 |
| 5,142,607 | 8/1992 | Petrotta et al. | 385/135 |

FOREIGN PATENT DOCUMENTS

| | | |
|---|---|---|
| 105597 | 4/1984 | European Pat. Off. |
| 159857 | 10/1985 | European Pat. Off. |
| 331402 | 9/1989 | European Pat. Off. |
| 408266 | 1/1991 | European Pat. Off. |
| 409390 | 1/1991 | European Pat. Off. |
| 2559916 | 8/1985 | France . |
| 81/00359 | 7/1982 | PCT Int'l Appl. |
| 88/01120 | 6/1989 | PCT Int'l Appl. |
| 89/01326 | 5/1990 | PCT Int'l Appl. |
| 1488409 | 10/1977 | United Kingdom . |
| 2113865 | 8/1983 | United Kingdom . |
| 2176024 | 12/1986 | United Kingdom . |

OTHER PUBLICATIONS

Instructions entitled "2400 Series Fiber Distribution Units High Density Cross–Connect System" publilshed by 3M in 1991.

Primary Examiner—John D. Lee
Assistant Examiner—Phan T. Heartney
Attorney, Agent, or Firm—Gary L. Griswold; Walter N. Kirn; Jack V. Musgrove

[57] ABSTRACT

A fiber optic connection system having a housing which receives a plurality of novel splice trays which are adaptable for use in either interconnection or cross-connection of the fibers. Each splice tray is formed of an upper tray section (having a reel for storing excess fiber slack in the first group of fibers and a splice area with clips for retaining splice elements) and a lower tray section which is either an interconnect card or a cross-connect card. The interconnect card has another reel for storing excess fiber slack in the second group of fibers, while the cross-connect card has no such reel but rather has walls for guiding the group of second fibers to a common exit point on the cross-connect card. The lower tray section is removably attached to the upper tray section whereby an existing splice tray can be modified from an interconnection configuration to a cross-connection configuration and vice-versa. The housing includes a pair of rails having holes therein for receiving pins on the edge of each splice tray whereby the trays may be pivotally attached to the rails in a page-type array. A stabilizer bar having several tabs is attached to the lower rail to releasably secure the splice trays in one of three predetermined positions.

19 Claims, 4 Drawing Sheets

FIBER OPTIC CONNECTION SYSTEM WITH EXCHANGEABLE CROSS-CONNECT AND INTERCONNECT CARDS

BACKGROUND OF THE INVENTION

1. Field of the Invention

The present invention generally relates to the interconnection of telecommunications lines, and more particularly to an apparatus for the management of an interconnecting and cross-connecting system for optical fibers.

2. Description of the Prior Art

In recent years, fiber optic cables have replaced traditional copper wire as the preferred medium for telecommunications. As with copper wires, it is necessary to provide cross-connections and interconnections between optical fibers at various locations in the distribution system. The present invention relates to a system and apparatus for simplifying such cross-connections and interconnections.

The prior art is replete with inventions on fiber optic organizers, junction boxes, etc. Several of these inventions utilize splice trays which slide out of a housing or cabinet like drawers. In many other units, the splice trays are pivotally attached to the housing. Pivotal attachment facilitates access to and manipulation of the splice trays, as well as minimizing space requirements. See, e.g., U.S. Pat. Nos. 4,266,853 and 4,792,203, and French Patent App. No. 2,559,916. Some trays are pivotally attached in such a manner that they can be flipped back and forth like pages in a book. See, e.g., U.S. Pat. No. 4,373,776, European Patent App. No. 159,857, and PCT App. No. GB88/01120.

Common features of a conventional splice tray include: a spool or reel for storing excess fiber slack and maintaining a minimum bend radius in the fibers to prevent undue stress or kinks; tabs or lugs which keep the fibers from slipping off the reel; a splice area having retaining clips or other means for attaching splice elements or connectors to the tray; and a cover for protecting selected portions of the fibers. The cabinets used with these trays often have a movable shelf for providing a work surface for, e.g., making the splice connections, and also often include a special panel cover or other means for preventing access to certain portions of the cabinet.

One limitation in the prior art splice trays relates to interconnection versus cross-connection of fibers. As used herein, "interconnection" refers to the direct connection of two fiber ends using a single splice element or connector, while "cross-connection" refers to the indirect connection of two fiber ends using at least one intermediate section of fiber such as a jumper, pigtail or patch cord, there being at least two splice elements or connectors, one at each end of the jumper. While some prior art designs provide for interconnection and others provide for cross-connection, there is no prior art fiber organizer which adequately addresses the need for both interconnection and cross-connection in the same unit. Furthermore, there are no prior art splice trays which may be adapted for use in either interconnection or cross-connection. Finally, with respect to splice tray arrays which can be flipped like pages in a book, even though such prior art arrays can facilitate access to fiber splices, the individual trays are oftentimes difficult to manipulate due to interference from adjacent trays which are free to swing in the technician's way. It would, therefore, be desirable and advantageous to devise a fiber optic splice tray and cabinet which overcomes the foregoing limitations by providing a splice tray which is adaptable to both interconnection and cross-connection, and by further providing means for securely holding the trays of a page-type array in predetermined positions.

SUMMARY OF THE INVENTION

The foregoing objective is achieved in a fiber optic connection system comprising a housing having means for hingedly attaching a plurality of splice trays to the interior of the housing in a page-type array, and means for releasably securing the trays in predetermined positions. The hinge is preferably formed by providing two generally parallel, spaced rails having a plurality of holes, respective pairs of the holes being aligned to receive pivot pins attached to the trays. The upper pivot pin is preferably longer than the lower pivot pin to allow easy removal and replacement of the trays. The means for securing the trays preferably takes the form of a stabilizer bar having a plurality of resilient tabs which provide an interference fit with camming dials on the trays. The housing may also have supplemental reels for taking up excess fiber slack, one or more panels for preventing access to certain portions of the interior of the housing, and a movable work shelf.

The splice trays are advantageously designed to be adapted for use as both an interconnect card and a cross-connect card. This is accomplished by providing an upper tray section having a fiber storage area and splice area, and an integral attachment mechanism proximate the splice area for receiving a lower tray section, which can be either a cross-connect card or an interconnect card having another fiber storage area. Moreover, the upper and lower tray sections are removably attached to one another whereby an existing group of interconnected fibers on one tray may be modified to provide cross-connections by exchanging the lower tray section, and vice-versa. Covers are provided for protecting the fiber storage areas of both the upper tray section and the interconnect card. The covers may include a foam pad for gently retaining the fibers against the tray.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
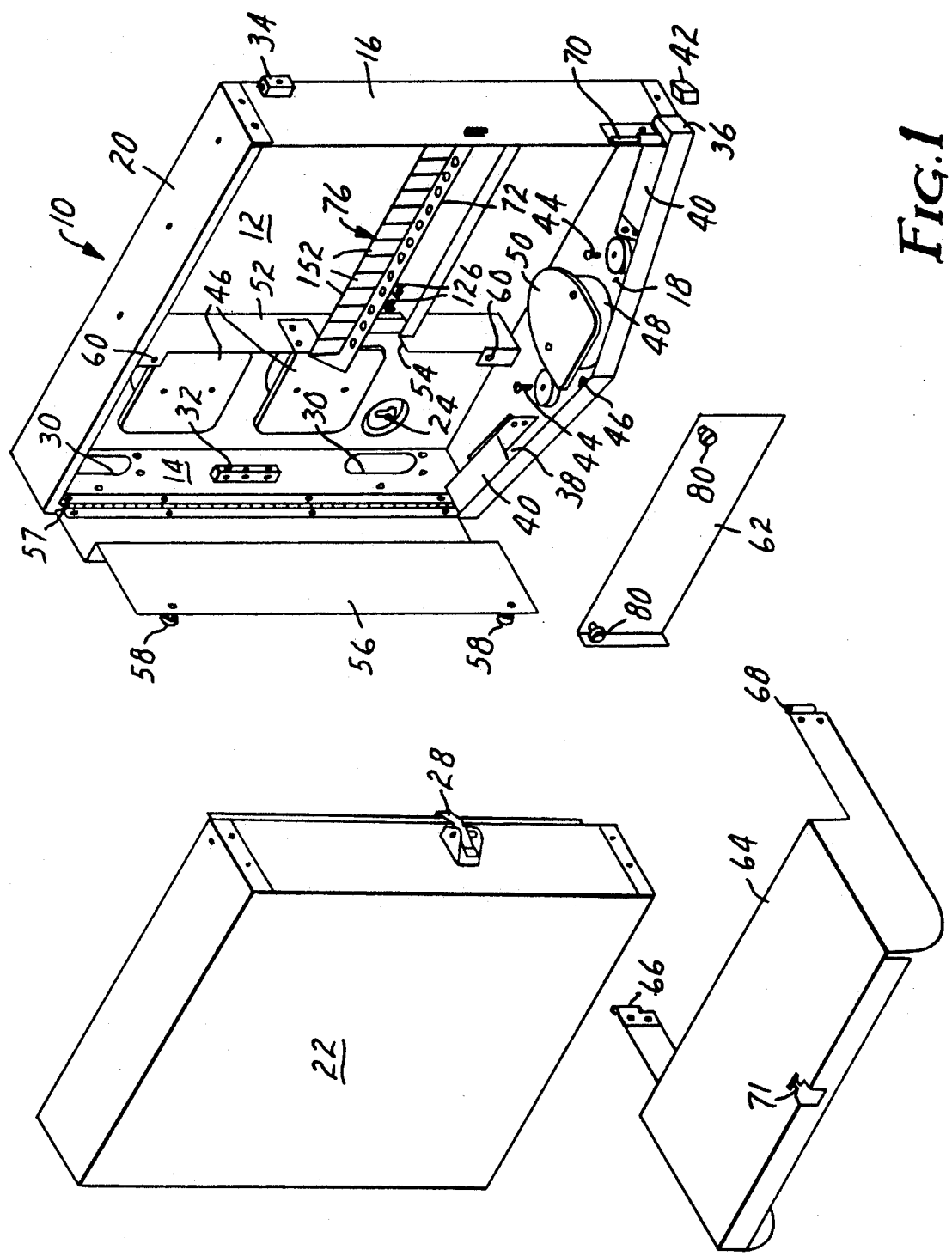
FIG. 1 is an exploded perspective view of the novel housing used with the fiber optic connection system of the present invention.

With reference now to the figures, and in particular with reference to FIG. 1, there is depicted a housing or cabinet 10 designed for use with the fiber optic connection system of the present invention. Housing 10 is generally rectangular in shape, having a rear wall 12, side walls 14 and 16, bottom wall 18, top wall 20, and cover 22, all of which may be constructed of any rigid, durable material, particularly a metal such as a galvanized steel sheet. Housing 10 may be provided with means for mounting it to an exterior surface, such as the teardrop holes 24 in rear wall 12 which may receive mounting bolts (not shown). Alternatively, housing 10 may be rack mounted by using a mounting bracket attached to various bolt holes provided in side walls 14 and 16. Cover 22 may be attached to housing 10 by any convenient means, such as hinge pins 26 (visible in FIG. 3), and securely fastened in a closed position by a latch 28.

The interior of housing 10 includes several features for fiber storage and organization. There are several holes in housing 10 for passage of fiber optic cables, including the side entry ports 30 located proximate a grounding block 32 which may be connected to a ground lead of the fiber optic cable. Grounding block 32 is in electrical contact with housing 10, which is further connected to electrical (earth) ground by an exterior grounding block 34. Both blocks 32 and 34 include one or more screws with side access holes for clamping grounding wires. Additional exit ports 36 for cross-connect jumpers are provided adjacent channels 38 formed by plates 40 (bent 90°), which are attached to the inner surface of bottom wall 18. Plugs 42 may be used to seal ports 36 when not in use. Screws 44 are also provided to clamp the strength members (KEVLAR filaments) of the cables to housing 10, imparting strain relief to the outgoing cables (grounding block 32 may also be used for this purpose). Several posts 46 are attached to the interior of housing 10 for storage of excess fiber slack. Each post 46 preferably includes a cylindrical spool 48 having an outer surface formed from a soft material, such as NEOPRENE (polychloroprene) foam, and a top plate 50 which overlaps spool 48 sufficiently to prevent the fibers from unravelling. Posts 46 maintain a proper bend radius for the fiber slack.

A partition 52 divides the interior of housing 10 into two areas, the left area in FIG. 1 being the fiber storage area and the right area in FIG. 1 being the fiber connection area. A small cutout 54 in partition 52 allows passage of the fibers from the storage area to the connection area. A panel 56, preferably hinged along one edge 57 to sidewall 14, is used to protect the storage area and restrict access thereto. Panel 56 may be secured in the closed position by a lock requiring a special craft tool, or simply by handscrews 56 which fit into holes 60 provided in tabs formed from partition 52. Another protective panel 62 is provided to restrict access to the fan-out area described below in conjunction with FIG. 3. A shelf 64 may also be provided to ease splicing operations. Shelf 64 has two tubular mounting brackets 66 and 68; bracket 66 attaches to the lower of the two hinge pins 26 (i.e., cover 22 must be removed from housing 10 to allow support of shelf 64), and bracket 68 attaches to a similar hinge pin 70. Shelf 64 is stored inside cover 22 when not in use, and may have a cutout 71 for receiving a latch (not shown) located on the inner surface of cover 22. For this reason, cover 22 should not be flat, and the cavity formed therein also provides space for the splice trays which are contained by housing 10.

Although housing 10 may be used with several different splice tray designs, it preferably receives a plurality of splice trays which are pivotally attached in a page-type array. To this end, a pair of spaced, generally parallel rails 72 are provided to pivotally support the splice trays. Only the lower rail is visible in FIGS. 1 and 3; the upper rail is obscured by the front lip of top wall 20. Each rail 72 contains a plurality of holes 74 for receiving pivot pins on the splice trays (see FIG. 2). The lower rail also has attached thereto a stabilizer bar 76 which is discussed below in conjunction with FIG. 4, and flaps 78 (see FIG. 3) for receiving screws 80 of protective panel 62. Rails 72 are attached at one end to partition 52 and at the other end to side wall 16.

Figure 2:
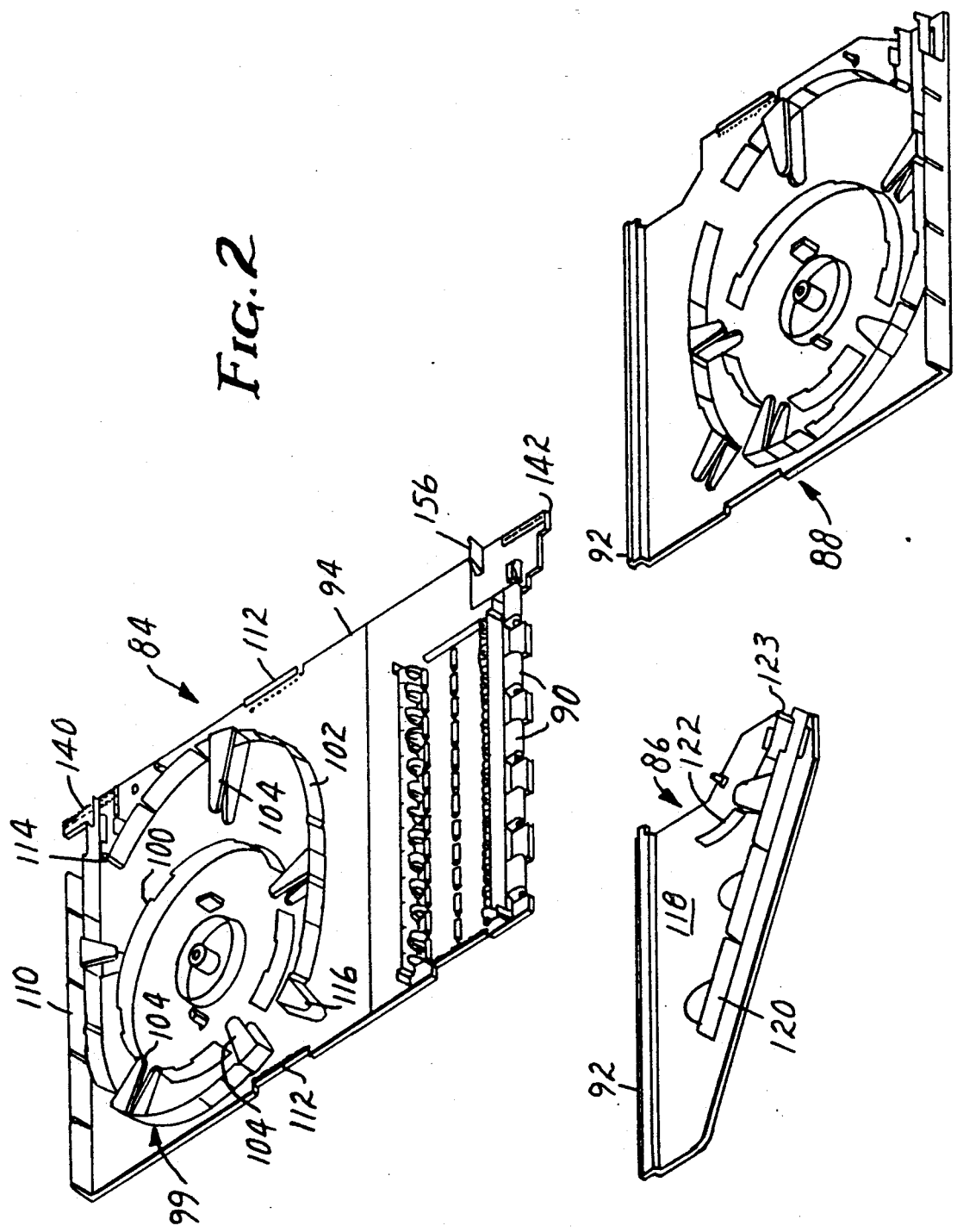
FIG. 2 is a perspective view of the splice tray of the present invention showing the upper tray section and the alternative interconnect and cross-connect cards forming the lower tray section.

The fiber optic connection system of the present invention advantageously utilizes the novel splice tray 82 shown in FIG. 2, which may be adapted for use with either interconnections or cross-connections. Tray 82 is comprised of an upper section 84, and a lower section which may alternatively be either cross-connect card 86 or interconnect card 88 (the terms "upper" and "lower" are used for descriptive purposes only and should not be construed in a limiting sense). As indicated by the arrows pointing from cross-connect card 86 and interconnect card 88 to upper tray section 84, either of these cards may be removably attached to upper tray section 84, preferably by means of a plurality of latch hooks 90 along the bottom edge of upper tray section 84 which grasp the flanged top edge of card 86 or 88 as the card slides into latch hooks 90.

Upper tray section 84 is comprised of a generally planar base 94 formed of any durable material, preferably an injection-molded polymer such as polycarbonate, whose surface is divided into a fiber storage area 96 and a connection or splice area 98. Fiber storage area 96 includes a reel 99 formed by a generally cylindrical inner wall 100 and an outer wall 102; excess slack in the optical fibers may be wrapped around inner wall 100, which maintains a minimum bend radius to prevent damage to the fibers. A plurality of flexible tabs or lugs 104 are used to keep the fibers positioned about inner wall 100 of reel 99. Upper tray section 84 preferably includes a cover 106 (see FIG. 3) which lies over and protects fiber storage area 96. In the preferred embodiment, cover 106 is attached by using a wide piece of adhesive film or tape 108, a portion of which is attached to the outside surface of cover 106, the remaining portion being attached to a flange 110 along the top edge of upper tray section 84, extending to the back side of base 94. Cover 106 snaps into flanged catches 112 to provide a snug interference fit. Optical fibers enter fiber storage area 96 through a break 114 in outer wall 102, and exit through another break 116, leading to splice area 98.

Splice area 98 includes a plurality of retaining clips or other means for holding the splice elements which are used to connect the fibers. In the preferred embodiment, splice tray 82 utilizes bare fiber mechanical splices, which impart a very low profile but provide for high density splicing. The preferred splice element is the high density mechanical splice element sold under model numbers 2401 and 2402 by Minnesota Mining and Manufacturing Company (3M), assignee of the present invention. Another suitable bare fiber mechanical splice is the FIBRLOK brand optical fiber splice element (FIBRLOK is a trademark of 3M). Other connectors may be used, even biconic and ferrule connectors, but this would decrease the splice density and may require changes in the geometries of housing 10 and splice tray 82. Use of the 3M 2400 series splices achieves a splice density three times that of conventional wall-mounted fiber connection systems. Although the term "connector" is usually reserved for devices which are intended to provide easy connection and disconnection, as opposed to a splice which is usually considered permanent, the terms "splice" and "connector" or "connect" are considered interchangeable with regard to the present invention, and should not be construed in a limiting sense.

If direct connections are to be made between respective optical fiber pairs, then interconnect card 88 is attached to upper tray section 84. Interconnect card 88 is essentially a mirror image of fiber storage area 96 of upper tray section 84, having another reel for storage of excess fiber slack, and a cover (not shown) essentially identical to cover 106. If, instead, jumper connections are to be made between different splice trays in housing 10 (or in an adjacent housing), then cross-connect card 86 is attached to upper tray section 84. Cross-connect card 86 has a fan-out area 118 defined in part by walls 120 and 122 which guide the fibers to a common exit point 123. Cross-connect card 86 is not provided with fiber storage means since the jumper fibers are normally cut to exact length (retermination is normally accomplished with a new jumper rather than an existing jumper), and excess slack in the jumper fibers may instead be wrapped around one of the posts 46 in housing 10. Moreover, the jumpers do not require much slack for pivotal movement since exit point 123 is located nearly in line with the axis formed by the pivot pins of tray 82. A U-channel may also be provided in the fiber connection area of housing 10, on bottom wall 18, to contain the jumper fibers and keep them separated from any interconnection fibers. Cross-connect card 86 and interconnect card 88 are both also preferably constructed of injection molded polycarbonate.

Figure 3:
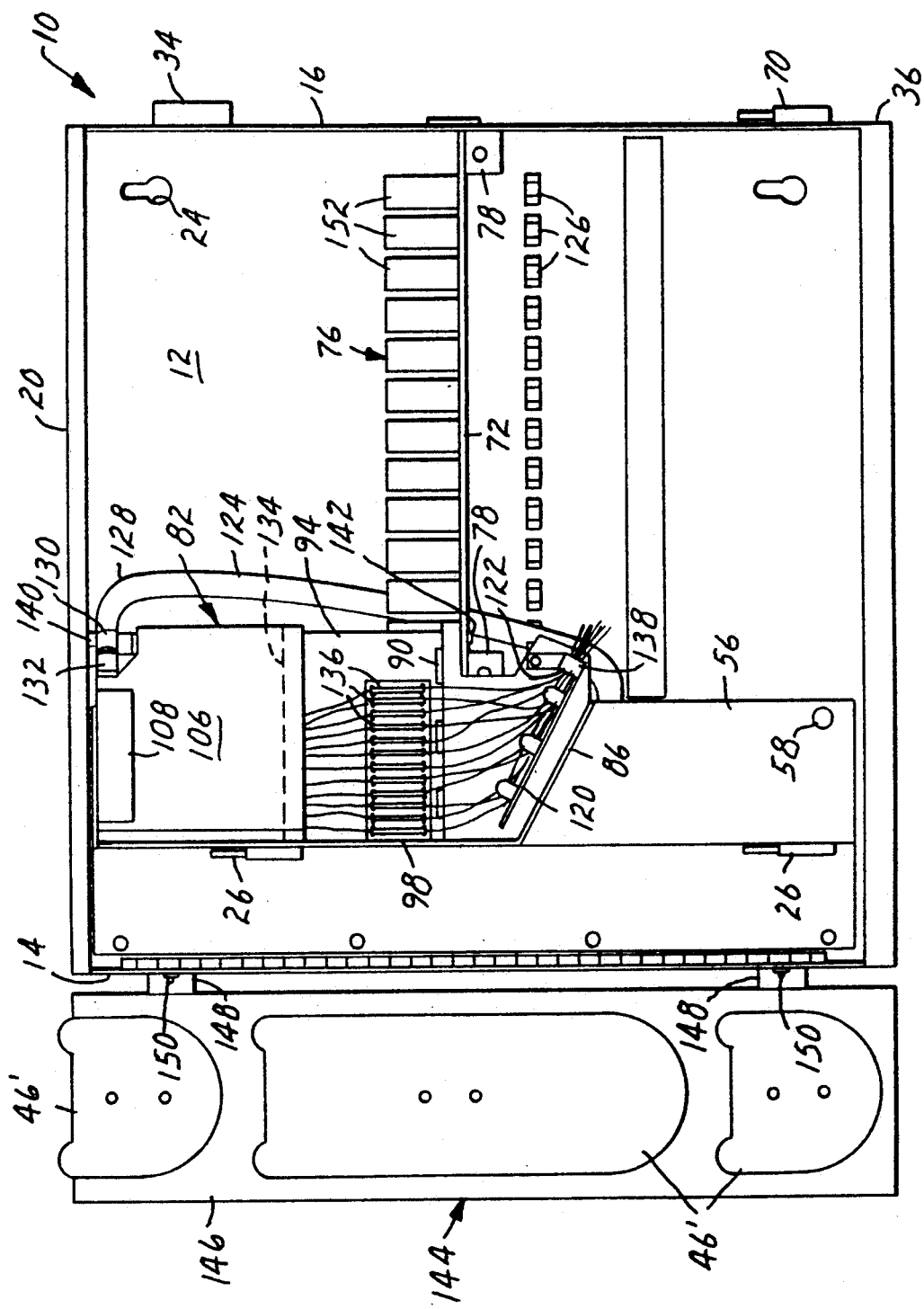
FIG. 3 is a front elevational view of the housing of the present invention depicting use of a splice tray adapted and cross-connection.

Use of the fiber optic connection system of the present invention may further be understood with reference to FIG. 3, a front elevational view of housing 10 showing a single splice tray 82 prepared for cross-connections (protective panel 62 is omitted in FIG. 3 for clarity). The I/O fiber cables are introduced into housing 10 (via ports 30), excess slack wrapped around posts 46 (some slack should remain to facilitate the splicing operation), and the terminal portion of the cable jacket is removed to expose individual fibers. Before any splice tray 82 has been positioned between rails 72, each group of fibers is threaded into a fan-out tube, such as that indicated at 124. Fan-out tube 124 is then passed through cutout 54 in partition 52, and releasably fastened to one of the plurality of tube clips 126 which are attached to the inner surface of rear wall 12 of housing 10. Trays 82 may be somewhat vertically staggered (i.e., alternate trays have higher and lower elevations, respectively) to keep adjacent fan-out tubes 124 from interfering with one another when adjacent trays 82 are rotated to opposing positions.

The distal end 128 of fan-out tube 124 is secured to base 94 of a splice tray 82 by a clamp 130 (splice tray 82 may be conveniently placed on work shelf 64 during this procedure). A clip 132 immediately adjacent to clamp 130 is biased downward to provide additional strain relief to the individual fibers. Clip 132 has a soft (e.g., natural rubber) pad which contacts the fibers. The fibers pass through break 114 in outer wall 102, and any remaining slack in the fibers is wound around reel 99, with the ends of the fibers passing through break 116 in outer wall 102. The craftsperson should insure that sufficient fiber length exits from reel 99 to reach splice area 98. Cover 106 may then be snapped closed; cover 106 also preferably has a foam (polyurethane) pad 134 (indicated in dashed lines in FIGS. 3) which not only provides additional strain relief but also helps maintain the fibers in the proper positions for the splice operation.

If the particular splice elements used allow pretermination of the fibers in the element (i.e., it is not necessary to simultaneously insert both fibers in the pair to be connected), then the fibers from storage area 96 may be so preterminated in splice elements 136. The lower tray section (i.e., cross-connect card 86 or interconnect card 88, depending upon the intended use), if not already attached to upper tray section 84, is now attached. If direct connection is needed, then each step in the foregoing two paragraphs is repeated for the second fiber cable and interconnect card 88; the terminal ends of the fibers in the second cable are then added to the splice. If indirect connection is required, the terminal ends of the jumper fibers are added to the splice, and the jumper fibers are positioned between guide walls 120 and 122 as depicted in FIG. 2. Another strain relief clip 138 may be provided with cross-connect card 86. The jumper fibers may be temporarily stored (until a second splice tray is prepared) by wrapping them around the post 46 on bottom wall 18 of housing 10. Cross-connection to a splice tray in another housing is accomplished by feeding the jumpers through channel 38 and out exit port 36.

Jumper and interconnections are preferably made after the splice trays have been attached to housing 10, although splicing could be completed prior to pivotally attaching the trays to the interior of housing 10 by means of pivot pins 140 and 142 which mate with holes 74 in rails 72. Pins 140 and 142 are formed integrally with base 94, but pin 140 is slightly longer than pin 142. In this manner, splice tray 82 may be removably attached to housing 10 by first inserting pin 140 into one of the holes in the upper rail, and then lowering tray 82 while guiding pin 142 into the corresponding hole in lower rail 72. The card may be removed later for additional splicing operations by simply reversing these steps. After all splice trays 82 have been completed, panel 62 should be fastened to flaps 78 to protect the area where fan-out tubes 124 are held by clips 126.

FIG. 3 also illustrates a fiber storage extension 144 which may advantageously be used when several housings 10 are stacked in a vertical configuration, i.e., top to bottom. Each extension 144 includes a supporting plate 146 which is mounted to housing 10 by, e.g., brackets 148 and bolts 150, and one or more additional posts 46' for storing excess cable slack. Extension 144 is mounted onto side wall 14, adjacent entry ports 30.

Figure 4:
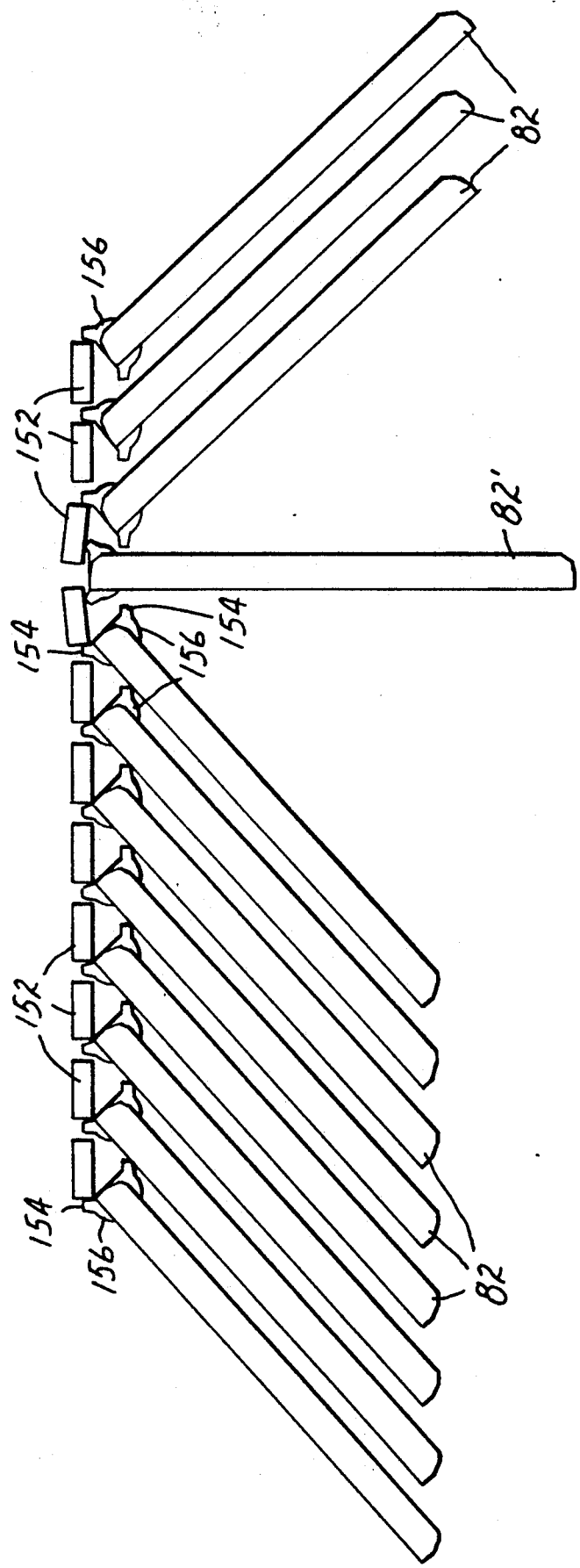
FIG. 4 is a top plan view schematically illustrating the function of the stabilizer bar in the housing used to position the splice trays.

Referring now to FIG. 4, the pivotal attachment of splice trays 82 to rails 72 results in the page-type array as illustrated, which allows close stacking of the trays and complements a reduced profile for the tray design. Any tray in the array may be accessed equally well by simply flipping the trays left or right as necessary. FIG. 4 also depicts the function of stabilizer bar 76, which includes a plurality of tines or tabs 152. Although tabs 152 could be physically separate from one another, attachment of tabs 152 to lower rail 72 is simplified if all of the tabs are integrally formed with stabilizer bar 76.

Tabs 152 are formed of any resilient material, such as polycarbonate, and are separated by a small distance, e.g., about 3 mm. The spaces thus created between adjacent tabs 152 provide an interference fit with one of two rigid prongs 154 formed on camming dials 156 which are attached to splice tray 82 (in the preferred embodiment, camming dial 156 is integrally molded With base 94 of upper tray section 84). The interference fit so created releasably secures the splice tray in a stable position, either slanted to the left or the right. Due to the resilient nature of tabs 152, trays 82 may easily be switched from one position to the other by simply pushing the trays in the desired direction, causing tabs 152 to flex slightly. Moreover, since the pivot axes of trays 82 are aligned with the spaces between tabs 152, each tray may be moved to a stable orthogonal position, as at 82', where two adjacent tabs 152 forcibly contact both prongs 154 of a given camming dial 156, leaving tray 82 halfway between the extreme left and right positions. This arrangement facilitates maintenance of the fiber optic connection system of the present invention since it prevent trays 82 from swinging freely which would hinder the craftsperson during manipulation of trays 82.

Although the dimensions of housing 10 and splice tray 82 can vary considerably depending upon the intended use, the following dimensions are considered exemplary. All measurements are approximate. The overall height of housing 10 is 45 cm, while its overall length is 43 cm, and its depth is 7½ cm. The width of the splice tray area within housing 10 (i.e., the distance from partition 52 to sidewall 16) is 27 cm. Holes 74 in rails 72 have a diameter of 7 mm, and adjacent holes are separated by 2 cm; in the preferred embodiment, there are twelve holes in each rail. Upper and lower rails 72 are separated by a distance of 22 cm. Spools 48 on posts 46 have an 8 cm diameter. The width of side extension 144 is 12 cm. Splice tray 82 is 14½ cm wide, while its length depends upon whether cross-connect card 86 or interconnect card 88 is attached to upper tray section 84; a cross-connect tray has an overall length of 29 cm, and an interconnect tray has an overall length of 34 cm. Base 94 of splice tray 82 is very thin, 2 mm, but cover 106 is about 8 mm thick, bringing the overall thickness of tray 82 to 1 cm. Cover 106 is 12½ cm high. The outer diameter of inner wall 100 of reel 99 is 7½ cm. Splice area 98 is 5 cm high and may extend nearly the full width of tray 82; in the preferred embodiment, splice area 98 contains twelve of the 3M 2400 series high density bare fiber mechanical splice elements. Camming dial 156 has an effective diameter of 14 mm, and prongs 154 extend another 2 mm beyond that circumference.

Those skilled in the art will recognize the many advantages conferred by the foregoing description. The fiber optic connection system of the present invention provides storage areas for sufficient maintenance slack of the fibers, a minimum bend radius on all fiber slack, strain relief to I/O and jumper fiber connections, and easy front access to all interconnection points. Installation, connections and reterminations are all accomplished from the front of system, with no need for rear access. Since the I/O fibers are protected by panels 56 and 62, fan-out tubes 124, and cover 106, they are not easily accessible and are thus less prone to damage and mismanagement. Furthermore, housing 10 may either be wall mounted or rack mounted, and splice tray 82 could easily be modified, e.g., for rack mounting, to slide within housing 10 rather than pivot in the page-type array. Finally, the system provides easy field configuration for either cross-connects or interconnects and, since the upper and lower tray sections are removably attached to one another, an existing group of interconnected fibers on one tray may be modified to provide cross-connections by simply exchanging out the lower tray section. This is particularly useful in constantly changing environments, such as synchronous optical networks (SONET).

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A device for holding a plurality of optical fiber splices formed by respective pairs of optical fibers, comprising:
   an upper tray member;
   means located on said upper tray member for storing excess slack in a first group of the fibers;
   means located on said upper tray member for retaining a plurality of splice elements;
   a lower tray member; and
   means for removably attaching said lower tray member to said upper tray member.

2. The device of claim 1 wherein said lower tray member is selected from the group consisting of a cross-contact card and an interconnect card.

3. The device of claim 2 wherein said cross-connect card includes wall means for guiding a second group of the fibers to a common exit point on said cross-connect card.

4. The device of claim 2 wherein said interconnect card includes means for storing excess slack in a second group of the fibers.

5. The device of claim 1 further comprising means for covering said storing means.

6. The device of claim 5 wherein said covering means comprises a cover member attached to said upper tray member and movable between open and closed positions, said cover member having an edge which, when in said closed position, is located between said storing means and said retaining means, said cover member having means, located at said edge, for gently securing fibers which pass from said storing means toward said retaining means.

7. The device of claim 1 further comprising means for pivotally attaching said upper tray member to an external housing.

8. The device of claim 1 further comprising a plurality of splice elements located in said retaining means.

9. The device of claim 1 wherein said storing means includes a reel having at least one generally cylindrical wall attached to said surface of said upper tray member.

10. A device for organizing optical fibers, comprising:
    a housing;
    a plurality of splice trays each having means for retaining a plurality of splice elements;
    means for pivotally attaching said splice trays to said housing in a page-type array whereby each said splice tray may be moved between a first position and a second position; and means for releasably securing each of said splice trays in said first and second positions, and in a third position which is approximately halfway between said first and second positions.

11. The device of claim 10 wherein each said splice tray pivots along an edge thereof, and said releasable securing means comprises:
- a plurality of resilient tab members attached to said housing proximate said splice trays, adjacent pairs of said tab members being separated by a space; and
- a plurality of prong means, one attached to each of said splice trays, for providing an interference fit with said spaces between said tab members.

12. The device of claim 11 wherein each said prong means comprises at least first and second rigid prongs attached to and extending away from said pivot edge of said splice tray, said prongs being sufficiently narrow to enter said spaces between said tab members.

13. The device of claim 10 wherein said pivotal attaching means comprises:
- first and second generally parallel, spaced rails each having holes therein, said holes in said first rail being generally aligned with said holes in said second rail; and
- at least two pivot pins attached to each said splice tray, said pivot pins having a common axis, extending in opposite directions, and being separated by a distance approximately equal to the distance between said first and second rails.

14. The device of claim 13 wherein each said splice tray pivots along an edge thereof, and said releasable securing means comprises:
- a plurality of resilient tab members attached to said first rail, adjacent pairs of said tab members being separated by a space, said spaces being generally aligned with said holes in said first rail; and
- prong means attached to each of said splice trays for providing an interference fit with said spaces between said tab members.

15. The device of claim 10 further comprising an extension member attached to said housing, said housing having an opening therein proximate said extension member for passage of a fiber optic cable, said extension member further having means for storing excess slack in the cable, said storing means maintaining said slack at a bend radius which prevents excessive damage to optical fibers in said cable.

16. The device of claim 10 wherein each said splice tray further comprises:
- an upper tray member, said retaining means being located on said upper tray member;
- means located on said upper tray member for storing excess slack in the fibers;
- a lower tray member; and
- means for removably attaching said lower tray member to said upper tray member.

17. A system for organizing and connecting respective pairs of fibers from a first group of fibers and a second group of fibers, the system comprising:
- a housing having an interior, and having at least one port for passage of the fibers;
- means for covering said interior of said housing;
- a partition attached to said housing dividing said interior into a fiber storage area and a fiber connection area;
- post means attached to said housing, located in said fiber storage area, for storing excess slack in the fibers;
- panel means attached to said housing for protecting said fiber storage area;
- first and second generally parallel, spaced rails attached to said partition and to said housing, in said fiber connection area, each rail having holes therein, said holes in said first rail being generally aligned with said holes in said second rail;
- a plurality of splice trays, each including an upper tray member, means located on said upper tray member for storing excess slack in the first group of the fibers, a plurality of splice elements, means located on said upper tray member for retaining said plurality of splice elements, a lower tray member, means for removably attaching said lower tray member to said upper tray member, and first and second oppositely directed pins located on an edge of said upper tray member and separated by a distance approximately equal to the distance between said first and second rails, whereby each said splice tray may be pivotally attached to said rails in a page-type array by inserting said first and second pins into aligned holes of said first and second rails, respectively, each said splice tray being movable between a first position and a second position; and
- means for releasably securing each of said splice trays in said first and second positions.

18. The system of claim 17 wherein said releasable securing means comprises:
- a plurality of resilient tab members attached and generally perpendicular to said first rail, adjacent pairs of said tab members being separated by a space, said spaces being generally aligned with said holes in said first rail; and
- prong means attached to each of said splice trays, at said edge thereof, for providing an interference fit with said spaces between said tab members.

19. The system of claim 17 wherein said lower tray member is selected from the group consisting of a cross-connect card and an interconnect card, said cross-connect card including wall means for guiding the second group of the fibers to a common exit point on said cross-connect card, and said interconnect card including means for storing excess slack in the second group of the fibers.

* * * * *